# United States Patent Office 3,334,212
Patented Aug. 1, 1967

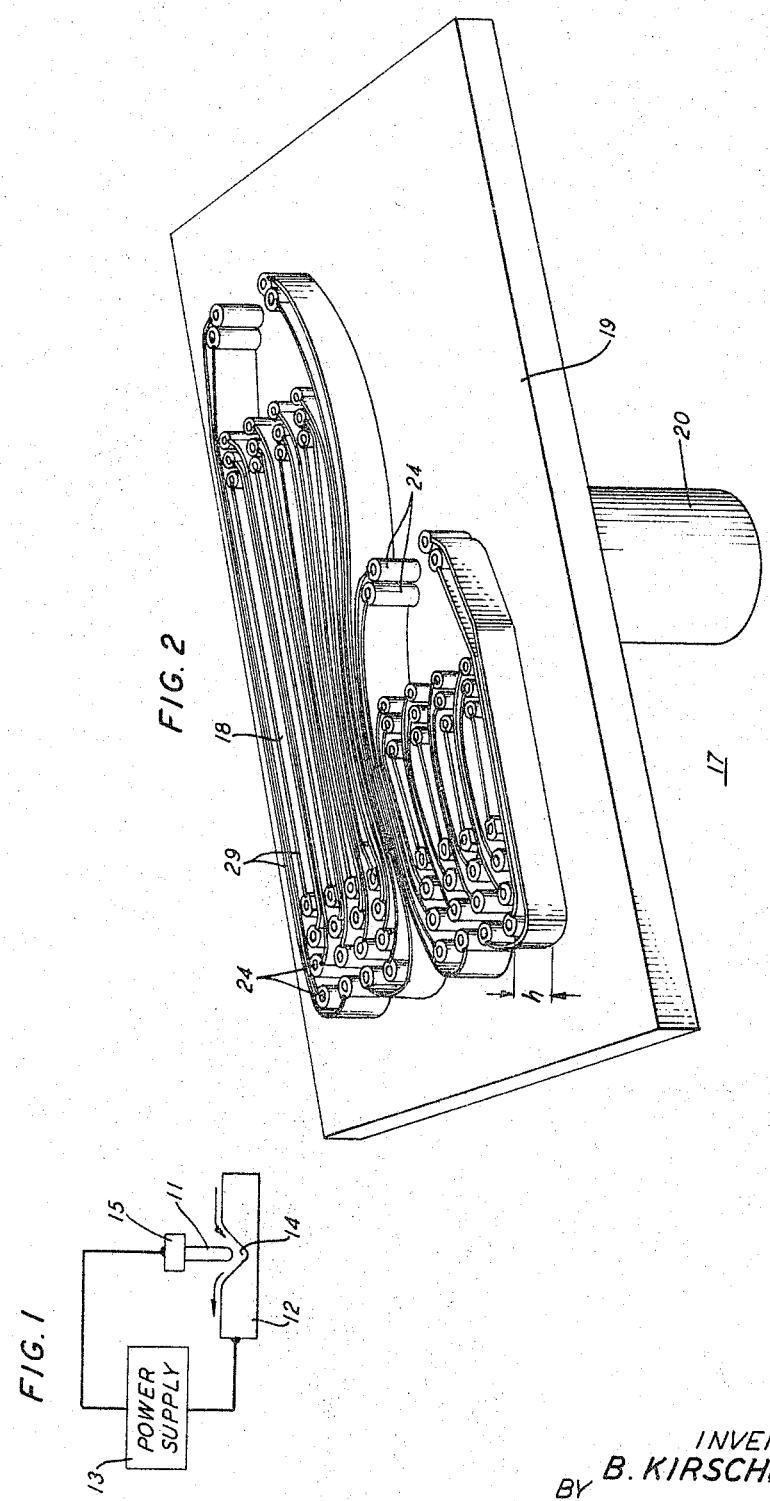

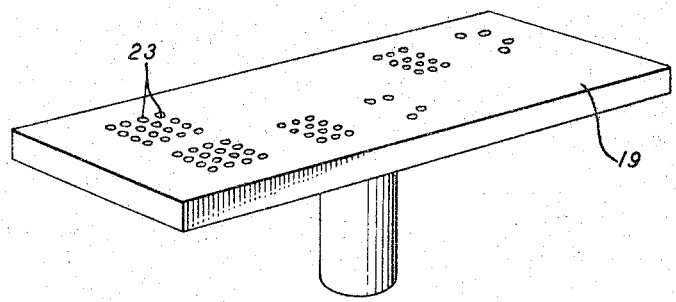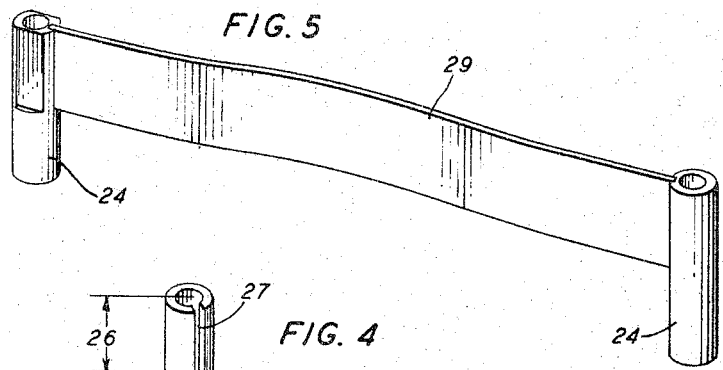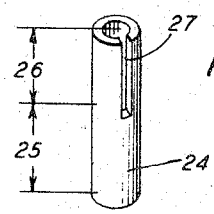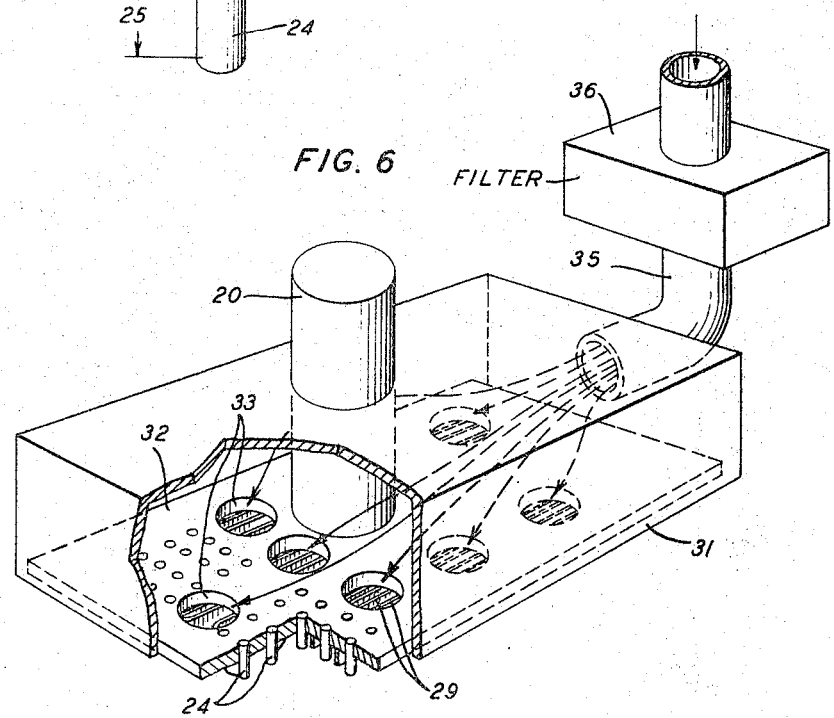

3,334,212
ELECTRODE AND ELECTRODE FABRICATION METHOD FOR ELECTRO-EROSION MACHINE
Bernard Kirschenbaum, Elizabeth, N.J., assignor to Bell Telephone Laboratories, Incorporated, New York, N.Y., a corporation of New York
Filed Jan. 30, 1964, Ser. No. 341,307
5 Claims. (Cl. 219—69)

ABSTRACT OF THE DISCLOSURE

An electrode having a circuit configuration is fabricated by drilling apertures in a flat surface of an electrode base at locations corresponding to "land areas" of the circuit, inserting slotted bushings in the apertures, and inserting flat conductive strips into the bushing slots. The bushings and strips are replaceably soldered to the base. Liquid dielectric is circulated throughout the circuit configuration by way of a central chamber in the base and a plurality of openings in the flat surface of the base.

Background of the invention

Electro-erosion, or electrical discharge machining, refers to a method of cutting metal through the use of an electrical arc discharge. The arc discharge, which is established in a gap between an electrode and a work piece, creates high temperatures in the gap and thereby erodes material from the surface of the work piece. The arc discharge can be fairly accurately controlled and is superior to more conventional machining techniques for such purposes as cutting precise grooves in a work piece.

Electro-erosion is particularly suitable for machining die plates which are to be used for manufacturing sintered circuits. Sintered circuits are similar to printed circuits in that conductive metal is deposited on an insulator board for defining circuit paths. The die plates used in this process must contain a configuration of grooves which corresponds to the sintered circuit to be manufactured therefrom. The electrode for eroding this grooved configuration in the die plate should itself have a structure which corresponds to the desired grooves. When one considers the complicated structure of most electronic circuit configurations, one can appreciate the difficulty in fabricating an electrode which has a corresponding structure.

Summary of the invention

It is an object of this invention to provide an electrode which can be used to electrically erode grooves in a work piece which are representative of a relatively complex electronic circuit configuration.

It is another object of this invention to simplify the fabrication of an electrode having the structural configuration of a complicated electronic circuit.

These and other objects of my invention are attained by an electrode which comprises an element having a flat base which is adapted for insertion into a conventional electro-erosion machine. Apertures are drilled in the flat base at predetermined locations which correspond to the "land areas" of the desired circuit. "Land areas" refers to enlargements in the circuit path to which electronic components can be connected. Bushings are then machined to fit snugly into each of the apertures. Axial slots are cut in the portion of the bushing which extends out from the aperture. The length and thickness of the slot correspond to the thickness and width of conductive strips which are to be inserted therein. By suspending each of a number of preformed conductive strips within the axial slots of pairs of bushings, the desired circuit configuration is formed on the base of the electrode. When the configuration formed by the strips and bushings is brought into proximity with a work piece, a die plate having the desired circuit configuration can be formed thereform by electro-erosion.

The bushings and conductive strips are advantageously held in position by first coating the base and the undersides of the strips with solder. After the electrode has been assembled, it is heated to a temperature sufficient to cause the solder to flow into the joints of the base, bushings, and strips. During the electro-erosion process, the strips and bushings are themselves eroded away and must be replaced if additional die plates are to be manufactured. This can be accomplished by simply heating the electrode assembly to melt the soldered joints and then removing the bushings so that appropriate replacements can be made.

Electro-erosion generally requires a liquid dielectric between the electrode and workpiece for controlling the electrical discharge and for carrying away debris formed by the erosion. In accordance with another feature of the invention, a chamber is provided within the electrode element for distributing the liquid dielectric to strategic portions of the electrical discharge. This is done by providing a plurality of apertures extending through the base of the electrode and by pumping liquid dielectric into the chamber which flows through the apertures to give a uniform dielectric circulation throughout the entire electrical discharge region.

Drawing description

These and other objects and features of the invention will be more clearly understood from a consideration of the following detailed description, taken in conjunction with the accompanying drawing in which:

FIG. 1 is a schematic view of an electro-erosion machine;

FIG. 2 is a bottom view of an electrode in accordance with the invention;

FIG. 3 is a bottom view of a partially assembled electrode in accordance with the invention;

FIG. 4 is a perspective view of a bushing in accordance with the invention;

FIG. 5 is a perspective view of a part of an electrode in accordance with the invention; and FIG. 6 is a perspective view of another embodiment of the invention.

Detailed Description

Referring now to FIG. 1 there is shown a schematic illustration of an electro-erosion machine comprising an electrode 11, a work piece 12, and a power supply 13. The power supply establishes an arc discharge between the electrode and the work piece which erodes material away from both the electrode and the work piece thereby forming a groove 14 in the work piece. The electro-erosion machine lowers the electrode 11 during the course of the operation to maintain the arc discharge and to cut groove 14 to a desired depth. Liquid dielectric is circulated through the discharge gap as shown by the arrows to control the arc discharge and to carry away debris. Since the electrode 11 erodes during operation, it must be replaced periodically; the electrode is secured to the electro-erosion machine by a collet 15 for facilitating replacement.

If a pattern is to be machined in the work piece in one operation, the electrode must have a configuration which conforms to the desired pattern. FIG. 2 shows an electrode 17 having a relief portion 18 which corresponds to a desired circuit configuration which is to be machined into a work piece. The relief portion extends above a base portion 19 to a typical height $h$ of approximately one-fourth inch. A shank 20 included in the electrode is of a proper size to permit easy insertion of the electrode into the collet of a commercially available electro-erosion machine. One can see that to manufacture electrode 17 by machining or etching out relief portion 18 would be very difficult and expensive. FIGS. 3 through 5 illustrate a method of assembling the relief portion in accordance with one aspect of my invention.

Referring now to FIG. 3, the first step of the method is to drill a plurality of apertures 23 in the flat metallic electrode base 19 at locations which correspond to the locations of enlargements or "land areas" of the relief portion of FIG. 2. A plurality of bushings 24 as shown in FIG. 4 are then machined which have an outer diameter that is equal to the diameter of the apertures 23. A lower portion 25 of the bushing has a length equal to the depth of the apertures. An upper portion 26 of the bushings contains an axial slot 27. Referring to FIG. 5, a plurality of conductive strips such as strip 29 are fabricated, each of which is shaped to form part of the relief configuration of the desired electrode. The thickness of each strip corresponds to the thickness of slots 27 in the bushings so that each strip may be inserted into the slots of two opposite bushings as shown in FIG. 5. The bushings and strips are made of an appropriate electrode material, such as brass.

Referring again to FIG. 2, the fabrication of electrode 17 in accordance with the invention comprises the steps of drilling a plurality of apertures in the base 19, inserting slotted bushings 24 into the apertures, and inserting conductive strips 29 into the bushing slots. In order to hold all of the elements in place, the flat surface of base 19 and the underside of the conductive strips 29 may first be plated with a thin coating of solder. After the electrode is assembled it is heated to a temperature sufficient to melt the solder and cause it to flow into the various joints. When the solder cools, the strips and bushings are contained firmly in place. Care should be taken to prevent solder from flowing up the sides of the strips to bridge the gap between adjacent strips. I have found that this problem can be avoided with a minimum clearance of .010 inch between the strips and a solder plating of .001 inch on the electrode base.

After the electrode has been used several times and the relief portion has been substantially eroded, the entire electrode can be heated to melt the solder, thereby permitting the bushings 24 and strips 29 to be replaced. The base 19 of the electrode can therefore be used indefinitely. This particular method of fabrication is particularly suited to the machining of electronic circuit configurations because the bushings 24 inherently define land areas which will be formed on the final sintered circuit which is manufactured from the work piece. Further, it is possible to change the grooved patterns to be cut by drilling additional apertures in the electrode base 21 and providing alternative sets of conductive strips 29.

Because of the complex configuration of electrode 17, it may be difficult to circulate liquid dielectric uniformly along the entire discharge region during operation. The embodiment shown in FIG. 6 ensures a uniform flow and distribution of the dielectric. The electrode of FIG. 6 comprises an electrode base portion 31 which includes an interior chamber 32. Bushings 24 and conductive strips 29 are attached to the electrode base in the same manner as in FIG. 2 and are therefore numbered accordingly. Extending through a lower wall of the electrode base are a plurality of apertures 33. Liquid dielectric is introduced into the chamber through an input pipe 35. The liquid dielectric flows through apertures 33 as shown by the arrows whereafter it is circulated back through a filter 36 and reintroduced to the chamber by the input pipe. The eight apertures 33 provide eight regions of access of the liquid dielectric to the electrical dicharge region and thereby ensures a much more uniform distribution than would be possible if the liquid dielectric flowed only along a single path.

The illustrations described have been drawn approximately to scale and represent preferred embodiments which are merely exemplary of the invention. For example, various dimensions other than those described could alternatively be used; in particular, the height of the relief portion of FIG. 2 may be increased to three-quarters of an inch to increase electrode life. Various other embodiments may be made by those skilled in the art without departing from the spirit and scope of the invention.

What is claimed is:

1. An electrode for use in an electro-erosion machine comprising:
   an electrode element including therein a central chamber;
   an electrode shank attached to the electrode element which is adapted for insertion into an electro-erosion machine;
   a plurality of small apertures extending into the outer surface of the lower wall of the electrode element;
   a plurality of bushings, each adapted to fit snugly into one of the small apertures;
   a slot in each of the bushings;
   a plurality of ribbon-like conductive elements each of which is contained by the slots of two of the bushings;
   a plurality of large apertures extending through the lower wall of the electrode element;
   and means for circulating liquid dielectric through the central chamber and the large apertures of the electrode element, thereby exposing the ribbon-like elements to the liquid dielectric.

2. The method of making an electrode capable of electrode-eroding a circuit pattern on a work piece comprising the steps of:
   drilling a plurality of apertures at predetermined locations in the base of a flat electrode element;
   cutting an axial slot in each of a plurality of cylindrical bushings;
   inserting the bushings in the apertures;
   and inserting a plurality of elongated conductive strips in the bushing slots;
   the two ends of each strip being inserted into the slots of two displaced bushings.

3. The method of making and using an electrode which is capable of electro-eroding a circuit pattern on a die plate comprising steps of:
   drilling a plurality of apertures at predetermined locations in the base of a flat electrode element;
   cutting an axial slot in each of a plurality of cylindrical bushings;
   coating part of the flat electrode element and part of each of a plurality of conductive strips with solder;
   inserting the bushings in the apertures;
   inserting the end portions of each of the conductive strips in the slots of two displaced bushings;
   heating the electrode assembly to a temperature above the melting point of the solder;
   cooling the electrode assembly;
   eroding a major portion of the bushings and conductive strips through the process of electro-erosion;
   heating the assembly to a temperature above the melting point of the solder;
   removing the bushings and conductive strips;
   and inserting new bushings into the apertures for the formation of a new electrode assembly.

4. An electrode for use in an electro-erosion machine comprising:
   an electrode element having a flat base;
   an electrode shank attached to the electrode element which is adapted for insertion into an electro-erosion machine;

a plurality of apertures extending into the base of the electrode element;
a plurality of bushings each fitting snugly into one of the apertures;
a plurality of conductive strips;
an axial slot in each of the bushings which has a length substantially equal to the width of each of the strips and a thickness which is substantially equal to the thickness of the conductive strips;
opposite ends of each of the strips being contained by the slots of two displaced bushings.

5. An electrode for use in an electro-erosion machine comprising:
an electrode element adapted for insertion into an electro-erosion machine;
a plurality of apertures extending into a surface of said electrode element;
a plurality of conductive holders each fitting snugly into one of the apertures;
a plurality of conductive strips extending along said surface of the electrode element;
said strips being supported by the holders;
the strips and holders being soldered to said surface of the electrode element, whereby the strips and holders may be removed for replacement by heating the electrode element above the melting point of solder;
the strips and holders together defining an electronic circuit configuration.

References Cited

UNITED STATES PATENTS

| | | | |
|---|---|---|---|
| 2,062,701 | 12/1936 | Cohen | 219—270 |
| 2,765,394 | 10/1956 | Griffith | 219—69 |
| 2,785,280 | 3/1957 | Eisler et al. | 219—69 |

RICHARD M. WOOD, *Primary Examiner.*

R. F. STAUBLY, *Assistant Examiner.*